3,279,303
TWO-PART EXPANSIBLE FASTENER
James R. Shackelford, Cuyahoga Falls, and Paul E. Perry, Akron, Ohio, assignors to The B. F. Goodrich Company, New York, N.Y., a corporation of New York
Filed Apr. 29, 1964, Ser. No. 363,512
2 Claims. (Cl. 85—75)

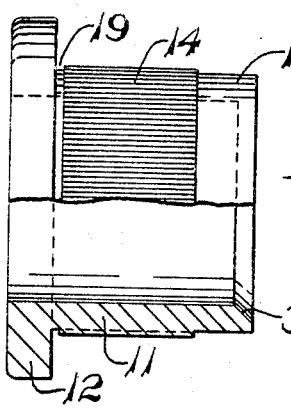
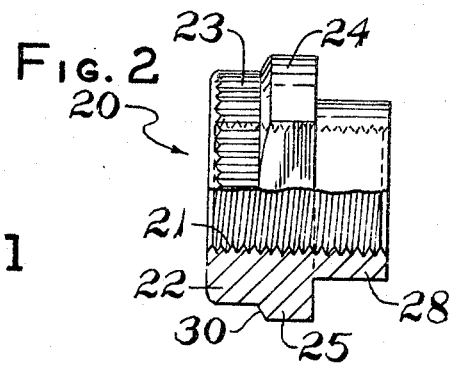
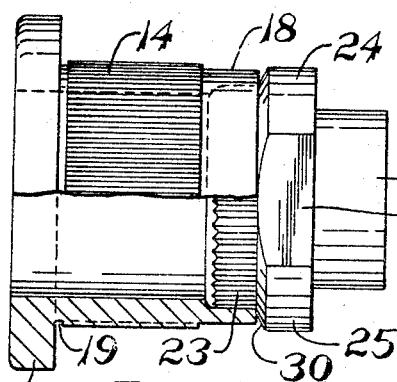
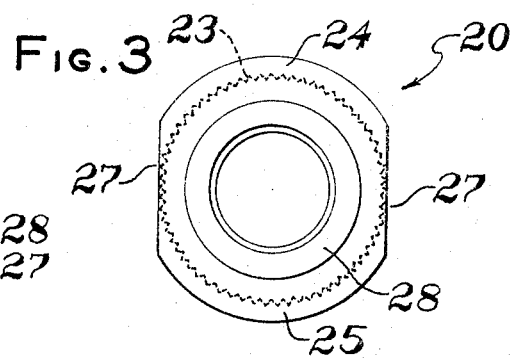
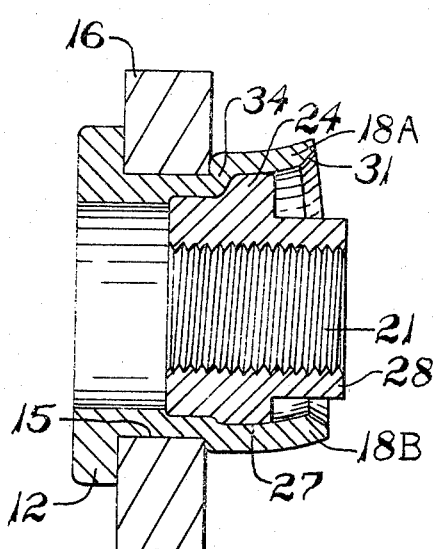
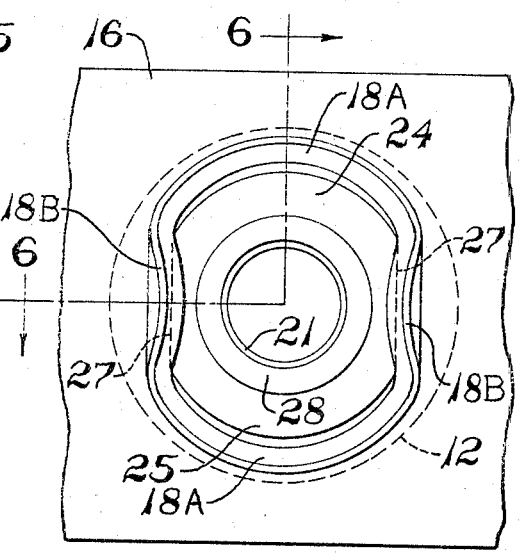
INVENTORS
JAMES R. SHACKELFORD
PAUL E. PERRY
BY John D. Haney
ATTY.

This invention relates to fasteners generally of the class known as hollow expansible rivets. More specifically the fastener of this invention is a duplex type fastener in which a sleeve is deformed or clinched to engage the work by forcing a separate expansion member axially through a sleeve.

The fastener of this invention may be used as a so-called blind fastener in that it may be installed and clinched entirely from one side of the work, although it is not limited to this mode of installation. It is useful to clamp layers of work to each other, or to plug a hole, or to provide a threaded hole in a work piece as a substitute for a tapped hole. It is also useful in either metallic or non-metallic workpieces, both rigid or flexible. In any of the foregoing service conditions the fastener provides much greater resistance to rotation in the work than corresponding fasteners previously known in the art. Moreover, the fastener may be used successfully in workpieces which vary widely in thickness, the acceptable variation being in the order of three times the grip range of conventional axially upset fasteners of corresponding size.

The basic parts of this fastener are a sleeve of ductile rigid material, and a rigid insert of unique shape which is separate from the sleeve but fits integrally and semi-permanently into one end of the sleeve. Most of the body of the insert is outside the sleeve end in the unclinched condition of the fastener. The insert is hollow and includes internal means such as a thread which is engageable by a suitable clinching tool for forcing the insert axially into the sleeve to clinch the fastener against the workpiece. The insert is semi-permanently joined to the sleeve in the unclinched condition by a shank on the insert which fits into the sleeve end in tight frictional engagement with the sleeve. The engagement is such that the sleeve and insert cannot be separated by manual force as could be exerted by a man's hands without tools. Accordingly, the sleeve and insert may be handled as a single unit prior to and during installation of the fastener.

The insert is shaped so that it radially expands only localized regions of the sleeve end as the insert is forced into the sleeve during clinching. Owing to the stresses in the sleeve end resulting from the expansion force exerted by the insert on these local regions of the sleeve, the regions of the sleeve end between the local expanded regions are caused to fold or deflect inwardly to embrace the insert tightly and preclude axial removal of the insert from the sleeve. In its deformed or clinched condition, the sleeve also exerts intense radial outward pressure within the installation hole in the workpiece. To augment the torque-resisting engagement of the sleeve with the work, the sleeve preferably has a knurl on its external surface. In those cases in which the sleeve is provided with a work-engaging head opposite the insert-engaged end of the sleeve, the work is squeezed axially between a head on the sleeve and the insert-deformed portions of the sleeve end. The thread or other tool-engaging means inside the insert not only is used for clinching the sleeve, but also the thread or other means is available undamaged after installation to receive a bolt or the like.

The invention will be further described with reference to the accompanying drawings which show, by way of example, one particular fastener designed according to and embodying the principles of this invention. In the drawings:

FIG. 1 is a side elevation, partly in cross section, showing the sleeve component of the fastener in undeformed condition;

FIG. 2 is a side elevation, partly in cross section, showing the insert component before it is assembled with the sleeve;

FIG. 3 is an axial end view of the insert taken from the right side of FIG. 2;

FIG. 4 is a side elevation, partly in cross section, showing the permanent assembly of the sleeve and insert but in their undeformed condition;

FIG. 5 is an axial end view showing the deformed end of the sleeve and the insert after the fastener is installed in a workpiece; and FIG. 6 is a cross-sectional view of the fastener in deformed condition, taken on the line 6—6 of FIG. 5.

Referring to FIG. 1, the sleeve 10 is made in the form of a cylindrical tube or body 11, with a radial flanged head 12 at one end. In its unclinched condition, the body portion 11 has an internal diameter of uniform size extending entirely through the sleeve. On the external surface of the sleeve there is a straight knurl 14 which is adapted to engage a hole 15 in a workpiece 16 (see FIG. 6) when the fastener is installed. The axial length of the sleeve 10 is determined by the thickness of the workpiece for which the fastener is intended. Ordinarily the length of the sleeve is selected so that its deformable end 18 will project beyond the workpiece while the head 12 is seated against the opposite side of the work. Preferably, the axial length of the knurl region 14 is slightly longer than the thickness of the workpiece. The knurl 14 may be spaced slightly from the head as indicated at numeral 19 and may terminate short of the opposing deformable end 18 of the sleeve. The sleeve 10 is preferably of a rigid ductile material or other material which can be deformed without cracking or shattering and remains rigid in its deformed condition.

Details of the insert 20 are best shown in FIGS. 2 and 3. The insert is hollow but is sufficiently rigid to avoid being deformed or crushed significantly as it is forced into the sleeve. An internal thread 21 extends axially through the entire length of the insert. At one end the insert has a shank 22 with an external knurl 23. Adjoining the shank 22 are two diametrically opposed sleeve-deforming shoulder regions 24 and 25 (see also FIG. 3). The periphery of the shoulder regions 24 and 25 is concentric with the axis of the insert and is about equal in diameter to the knurl 14 of the sleeve 10. The shoulder regions 24 and 25 are separated from each other by a pair of flat diametrically opposed locking surfaces 27, 27 which are in parallel planes to the axis of the insert. The opposing ends of the locking surfaces 27 merge into the periphery of the shoulder regions 24 and 25. The remaining portion of the insert consists of a cylindrical shank 28 which is smaller in diameter than the diameter of shank 22. Shank 28 may be of any axial length desired to provide an adequate length to thread 21.

The sleeve 10 and the insert 20 are made separately and then they are joined together integrally and semi-permanently as shown in FIG. 4 by forcibly pressing the shank 22 of the insert into the deformable end 18 of the sleeve. For this purpose, the crown of the knurl 23 on the insert is slightly greater than the internal diameter of the sleeve 10 and the root diameter of the knurl 23 is about equal to or slightly larger than the internal diameter of the sleeve so that the knurl cuts into the wall of the sleeve as the insert is forced into place. This assembly is made, however, with minimum stretching or belling of the deformable end 18 of the sleeve. After the assembly of the sleeve and insert as shown in FIG. 4, the sleeve and insert may be handled as a single integral unit, the engagement between the shank 22 and the end 18 of the sleeve being such that relative rotation or axial separation is precluded by manual force such as could be exerted by a man's hands without tools.

As best shown in FIG. 2, the shoulder regions 24 and 25 each have a slanting annular surface 30 extending between the shank 22 and the periphery of the shoulder regions. The interior edge of the deformable end 18 of the sleeve has a corresponding chamfer 31 as best shown in FIG. 1. This chamfer is adapted to assist the entry of the shank 2 on assembly of the insert with the sleeve as shown in FIG. 4, as well as to assist the entry of the shoulder regions 24 and 25 into the end of the sleeve when the fastener is installed.

The diameter of the workpiece hole 15 (FIG. 6) is slightly larger than the outer diameter of he knurl region 14 so that the sleeve slides easily into hole 15 when the fastener is installed. The fastener may be clinched to the work by the use of any one of a number of suitable clinching tools (not shown) which are well known in the art. The ordinary operation of such clinching tools is such that the tool stud (not shown) is first inserted through the head end of the sleeve and threaded or otherwise engaged inside the insert 20. When so engaged on the tool the fastener is then inserted into the work hole 15. The tool is then positioned to press the head 12 of the sleeve firmly against the work 16 while the tool stud (not shown) is retracted axially through the sleeve thereby pulling the insert 20 axially inside the deformable end 18 of the sleeve until the sleeve reaches a position of tight engagement with the workpiece as shown in FIG. 6. Thereafter the tool stud is disengaged from the insert and withdrawn from the sleeve.

As the shank 22 is advanced progressively into the sleeve the sleeve is uniformly circumferentially expanded by the shank 22, the serrations 23 of the shank ordinarily remaining at least partially embedded in the interior wall of the sleeve. Simultaneously, the tapered surface 30 leading from the shank to the peripheral regions of shoulders 24 and 25 is forced initially against the chamfer 31 at the sleeve end to expand the sleeve to assist the entry of the shoulder regions 24 and 25 into the sleeve end.

When the front face of the shank 22 is moved into the region inside the sleeve which is externally surrounded by the work hole, the diametrical expansion of the sleeve by the shank is resisted by the work-piece so that the external serrations 14 on the sleeve are forcibly embedded in the sides of the work hole. Concurrently with the foregoing effect, the serrations 23 on the shank 22 are embedded even more firmly into the internal surface of the sleeve so that intensive radial gripping pressure is developed between the external surface of the sleeve body against the work hole.

Although in the preferred construction, the knurling 23 is initially embedded in the interior surface of the sleeve (FIG. 4) in the unclinched condition of the fastener, the embedment tends to be relieved somewhat by the circumferential expansion of the sleeve end during the initial phases of the installation, because of the expansion of the sleeve by shoulders 24 and 25, until such time as the forward face of shank 22 reaches the region in the sleeve surrounded by the workpiece. After the shank 22 progresses beyond the latter point, however, the knurl 23 is reembedded firmly in the sleeve because the workpiece constrains the sleeve from any further tendency to expand away from the shank 22. Accordingly, in addition to the radial pressure which as developed, the knurls 23 and 24 mutually cooperate to provide the fastener with a high torque-out resistance. That is to say, in the clinched condition, the resulting assembly is such that in any predictable service condition there is no reasonable possibility that the insert can be rotated relative to the sleeve, or the sleeve rotated relative to the work when the fastener is eventually subjected to torsional forces such as the subsequent installation of a threaded bolt or the like into the insert.

In the clinched condition of the fastener, the engagement of the insert with the sleeve, and the sleeve with the work is also greatly augmented by the axial engagement of the tapered surface 30 of the insert against the region of the sleeve which is deformed into an S-shaped curve against the inner rim of the work hole 15 and as shown in FIG. 6. Surface 30 also provides a positive "stop" for the installation operation. The workman installing the fastener can feel by the tool when the surface 30 of the insert reaches the position in FIG. 6, at which point the workman knows the installation operation is complete. Referring to FIG. 6, the S-shaped deformed region of the sleeve is squeezed tightly at numeral 34 between the tapered surface 30 and the inner rim of the work hole 15. The force exerted on the sleeve wall in the region of numeral 34 is so intense that the inner surface of the sleeve wall tends to extrude snugly around the base of shank 22 at its junction with the tapered surface 30.

As previously mentioned, the opposing shoulder regions 24 and 25 are advanced into the sleeve end as the insert is moved through the sleeve, to thereby exert expanding forces at the diametrically opposite regions 18A (see FIG. 5) of the sleeve end. The circumferential stresses in the sleeve end resulting from this deformation are such that the regions 18B of the sleeve end tend to fold inwardly tightly against the flat locking surfaces 27, 27, and further, to fold radially inward toward each other after the peripheral portions 24 and 25 have been drawn entirely inside the end of the sleeve. Sleeve regions 18B, as shown in FIGS. 5 and 6, fold radially inwardly toward shank 28 behind locking surfaces 27, 27, actually thereby embracing these surfaces to positively preclude axial separation of the insert from the sleeve or, in fact, even any significant displacement of the insert from its FIG. 6 position in which its surface 30 is clinched tightly against the wall of the sleeve. The engagement of the regions 18B of the sleeve with the flat locking surfaces 27, 27 further tends to preclude relative rotation of the insert inside the sleeve.

The length of the thread 21 inside the insert and the material from which the insert is made are selected so that the thread 21 is not damaged by the clinching operation. Thereafter, the upsetting tool may be removed and the thread 21 of the insert is available to receive a bolt or screw (not shown), or the like to attach other equipment to the workpiece 16.

The most satisfactory design for this fastener is one embodying an insert with two diametrically opposed parallel flat locking surfaces 27, 27. Where more than two sides are used, the sleeve end 18 is deformed into corners which detract from the desired gripping engagement with the insert. Only one flat surface 27 may be used but with a threaded upsetting tool, this tends to throw eccentric loads on the insert and is, therefore, not as satisfactory as using two locking surfaces.

Instead of the foregoing mode of clinching, the fastener may be clinched by applying axial force directly on the shank end 28 of the insert to urge it inside the sleeve. This latter mode of clinching may be used if both sides of the workpiece are available.

Variations of the construction may be made within the scope of the appended claims.

We claim:
1. A fastener comprising:
 (a) a sleeve of ductile rigid material which is circumferentially continuous;
 (b) an insert which is rigid and circumferentially continuous for expanding the sleeve to engage a workpiece, the insert having:
 (c) a cylindrical shank which is in press-fitted engagement with one end of said sleeve in the unclinched condition of the fastener;

(d) a pair of sleeve-expanding body portions disposed in diametrically opposed relation on opposite sides of said insert adjoining said shank and each normally outside said sleeve end in the unclinched condition of the fastener, said portions terminating in an arcuate periphery which is radially larger than said shank and which is approximately flush with the outside surface of said sleeve end;

(e) each said sleeve-expanding body portion having a surface tapering from said shank to said arcuate periphery of said portion for initially expanding the sleeve end during clinching;

(f) a pair of plane parallel locking surfaces tangent to said shank on opposite sides of said insert so that the distance between said plane locking surfaces is substantially equal to the outer diameter of said shank, said locking surfaces merging with said arcuate periphery of said sleeve-expanding body portions; and (g) threaded means on said insert for engagement by an independent matingly threaded rotary tool for forcing said insert axially inside said sleeve end to radially expand said sleeve end and to deform said sleeve end into engagement with a surrounding workpiece and with the body of said insert.

2. A fastener as defined in claim 1 and further characterized in that the outside surface of said sleeve and said insert shank each has a knurl thereon.

References Cited by the Examiner

UNITED STATES PATENTS

| | | | |
|---|---|---|---|
| 2,319,376 | 5/1943 | Wallace | 85—75 |
| 2,381,113 | 8/1945 | Cook | 85—75 |
| 2,409,352 | 10/1946 | Gill | 85—75 |
| 2,435,876 | 2/1948 | De Swart | 85—74 |
| 2,544,304 | 3/1951 | Eckenbeck et al. | 151—41.73 |
| 2,756,624 | 7/1956 | Austin | 85—78 |
| 2,954,718 | 10/1960 | Brilmyer | 85—78 |
| 3,039,798 | 6/1962 | Carlson et al. | 151—41.73 |
| 3,174,523 | 3/1965 | Hult | 151—41.73 |

FOREIGN PATENTS 625,331 6/1949 Great Britain.

CARL W. TOMLIN, *Primary Examiner.*

M. PARSONS, JR., *Examiner.*